United States Patent [19]
Mason

[11] 3,764,910
[45] Oct. 9, 1973

[54] HIGH EFFICIENCY PERMANENT MAGNET METER

[75] Inventor: David P. Mason, Braintree, Mass.

[73] Assignee: Beede Electrical Instrument Co., Inc., Penacook, N.H.

[22] Filed: Dec. 23, 1971

[21] Appl. No.: 211,477

[52] U.S. Cl. .......................... 324/146, 324/154 PB
[51] Int. Cl. ........................... G01r 1/20, G01r 1/00
[58] Field of Search ............... 324/146, 147, 154 PB

[56] References Cited
UNITED STATES PATENTS

| | | | |
|---|---|---|---|
| 2,175,046 | 10/1939 | Warner | 324/146 |
| 3,618,562 | 11/1971 | Erbert | 324/154 PB |
| 2,002,445 | 5/1935 | Arey et al. | 324/146 |

FOREIGN PATENTS OR APPLICATIONS

| | | | |
|---|---|---|---|
| 325,506 | 2/1930 | Great Britain | 324/147 |

Primary Examiner—Alfred E. Smith
Attorney—Joseph Weingarten et al.

[57] ABSTRACT

A permanent magnet meter for providing a scale indication of the magnitude of an electrical signal. The meter comprises a permanent magnet rotationally supported by a plurality of thin vanes loosely fitted through slots therein to allow rotation of one vane with respect to another. An arctuate flux path of high permeability material is spaced from the permanent magnet to receive the magnetic flux through an air gap which increases with rotation of the magnet. The magnetic force between the magnet and flux path torques the magnet to a position of minimum air gap and biases the vanes pivots to minimize the motion resulting from the looseness of fit between the vanes. An electrical coil is wound about the flux path and responds to the electrical signal being measured to provide a flux in the path counteracting that from the permanent magnet and causing rotation of the permanent magnet to a point of equilibrium at a new angle defined by an alteration in the permanent magnet flux in response to the coil induced flux.

25 Claims, 10 Drawing Figures

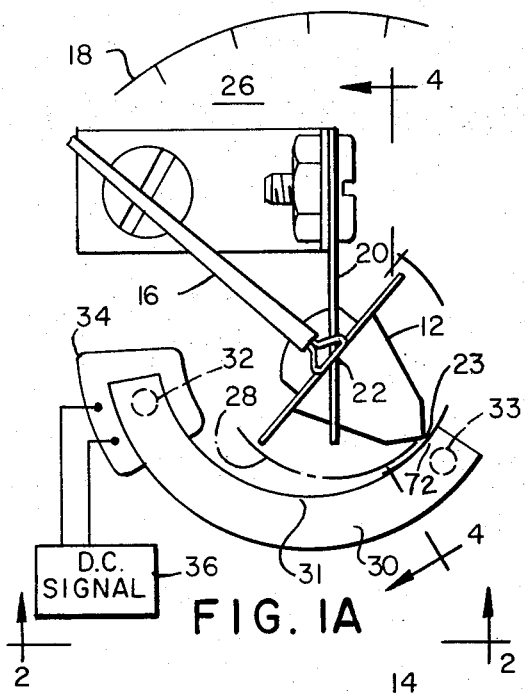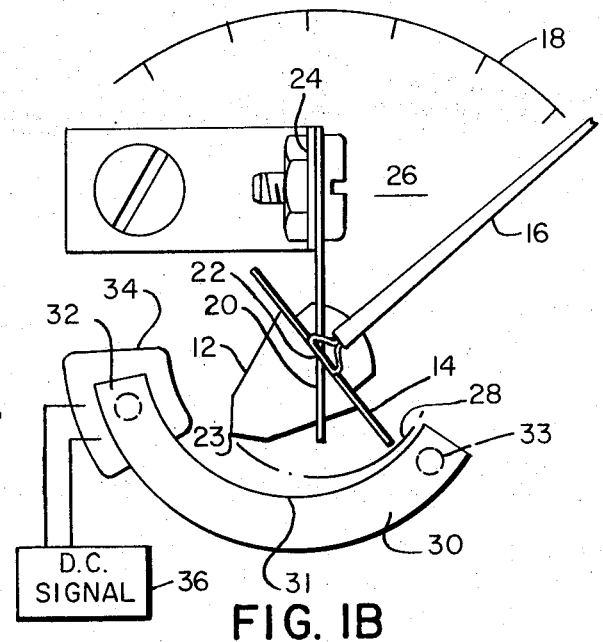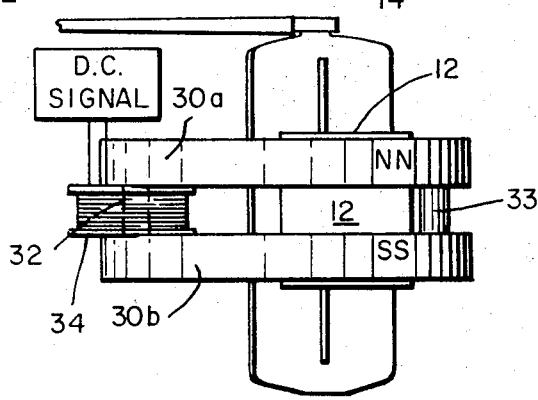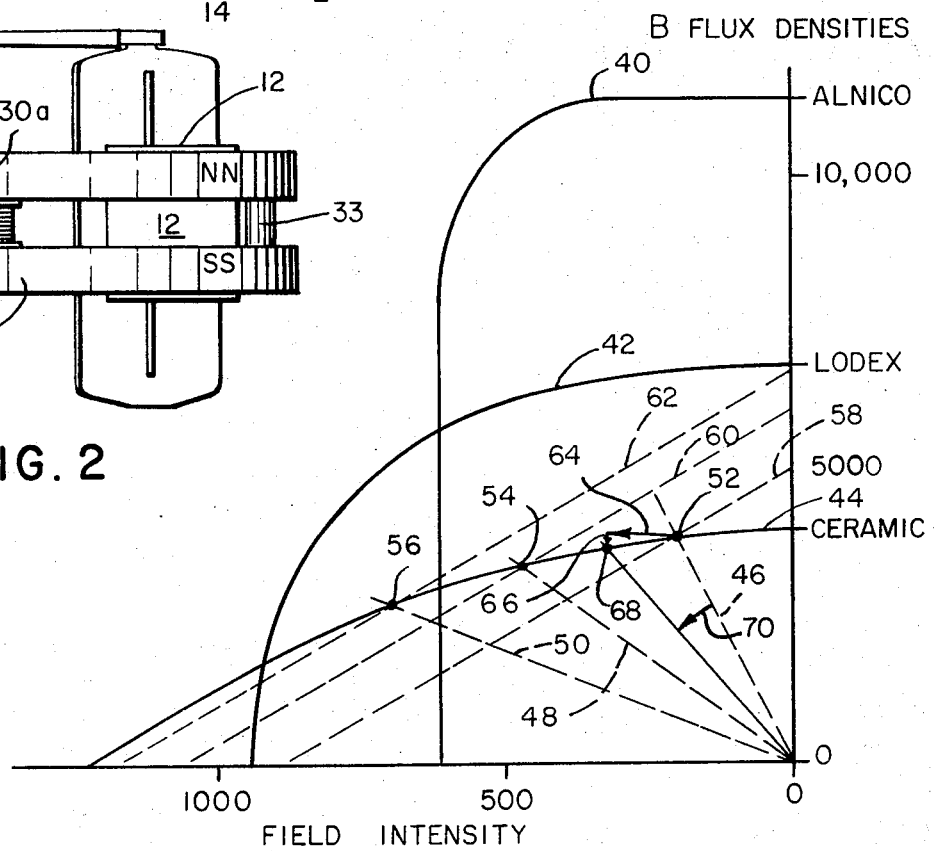

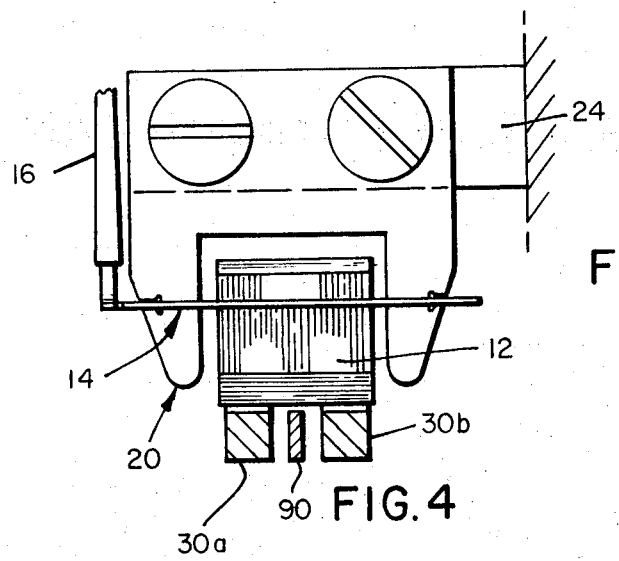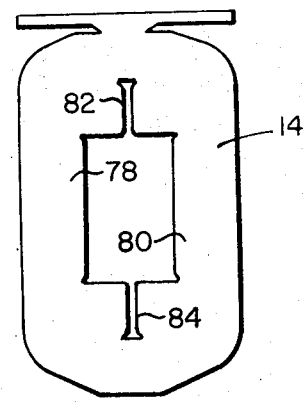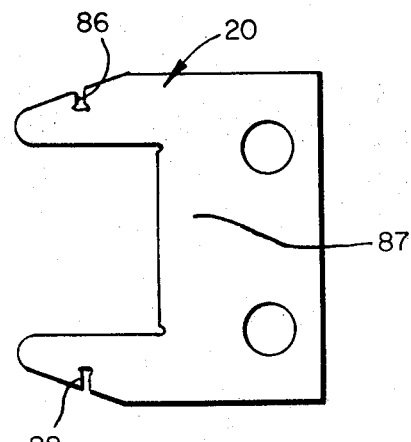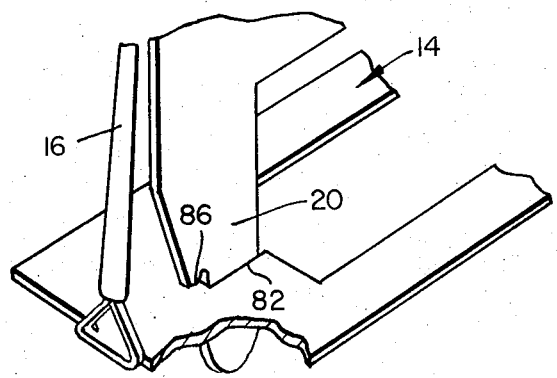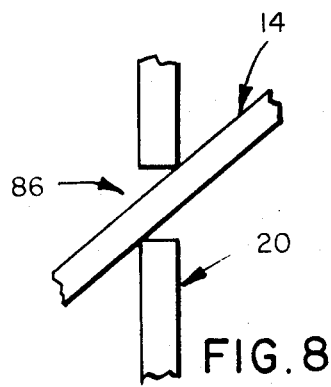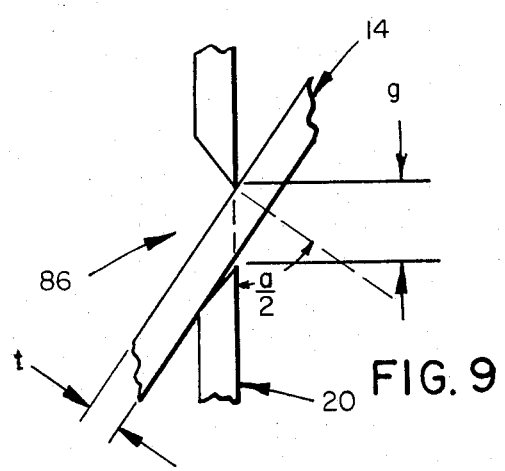

HIGH EFFICIENCY PERMANENT MAGNET METER

FIELD OF THE INVENTION

This invention relates to the measurement of electricity and in particular to meters indicating the magnitude of an electrical signal.

BACKGROUND OF THE INVENTION

In the design of an electric meter several basic functions combine to provide a practically operating meter whose deflection increases with the magnitude of an electrical signal. These functions include motivation to cause deflection of the meter elements in response to the electrical signal, restoration which counteracts the motivation, and the suspension which rotationally or otherwise supports the meter movement and its associated pointer. These functions are necessary in any meter, and the precision with which they operate determines meter accuracy, while the complexity of the design determines cost. It is desirable then to provide a meter design where these functions are accomplished as simply and precisely as possible with each meter component cooperating toward total meter functioning and not creating further problems which require complex and expensive compensating designs.

In the D'Arsonval meter, one of the commonly found meter types, most of these features are provided by independently operating, complex elements. For example, suspension is commonly provided by a precision pivot and jewel mechanism. Motivation is the result of the interaction between current in a moving coil and a magnet field where the coil design is not readily mass produced or assembled. The restoring force, and application of the signal to the motivation source is achieved by a spring mechanism, commonly one or more delicate spiral bands connected between the moving coil and meter casing. Where the filar suspension is used, some design simplification is possible, but a greater vibrational sensitivity results often necessitating ackward damping techniques.

Thus, while the D'Arsonval meter is capable of very accurate measurements of electrical magnitudes, this accuracy is achieved at great cost owing to the complexity of the meter elements necessary for precise and consistent operation.

As a less costly alternative to the D'Arsonval meter, the less accurate and less efficient "moving magnet" meter design may be used. In these meters, a large permanent magnet is rotationally supported and torqued through an angle by interacting magnetic fields produced by application of the electrical signal to a coil. In a moving magnet design, suspension is provided by the same techniques as in the D'Arsonval meter. Restoration can be provided by the use of a second, fixed magnet torquing the rotating magnet in a direction opposite to that from the motivation. Supplying motivation excitation is less of a problem since no signal must be applied to moving members. The moving magnet design, however, has substantial performance defects. The meter torque is very nonlinear with applied signal and not consistently predictable from one meter to the next. High magnet weight due to poor coupling between the magnet and coil and low damping permit excessive meter "wiggle." The poor coupling also reduces meter efficiency and increases the disturbances from magnet fields in the meter environment.

BRIEF SUMMARY OF THE INVENTION

In the present invention an electrical meter of simple but accurate design is provided wherein the primary features of motivation, restraint, and suspension are accurately provided by the interaction of simple elements in a meter structure.

In a preferred embodiment, a permanent magnet is suspended by a knife edge pivot to rotate through a predetermined angle. A fixed flux path is provided between the poles of the permanent magnet and varies in reluctance with rotation of the magnet. Restoration results from magnetic forces between the rotatable magnet and fixed flux path restraining the magnet to a stable angle of minimum reluctance. These same forces provide the further benefit of applying a force bias to the knife edge suspension that improves its motional stability and simplifies meter balancing. Motivation is provided by a coil wound around the flux path and excited by the electrical signal being measured. The coil current induces a secondary flux within the flux path that alters the permanent magnet flux according to its demagnetization curve and causes it to rotate to a new stable point of different flux path reluctance as defined by the current in the coil.

In a particular design implementation for the present invention, the flux path comprises a ferro magnetic material of high permeability formed in first and second parallel arcs and placed slightly eccentric to the axis of rotation of the permanent magnet to provide a small air gap between the magnet and ferro magnetic material which increases with rotation of the permanent magnet. The parallel arcs of ferro magnetic material may be viewed as separated from each other along the direction of the axis of rotation and have at one end a ferro magnetic spacer completing the high permeability flux path from one to the other and having wound therearound the coil excited by the electrical signal being measured.

The knife edge suspension preferrably comprises two or more thin, low permeability metal vanes having small slots therein which permit the vanes to fit together in a somewhat loose fit that permits rotation of one vane with respect to the other. The permanent magnet is mounted on one vane while the other vane is secured to the meter housing. The flux path as structured above accepts a substantial portion of flux from the permanent magnet passing from one pole thereof to the other and results in a force of attraction between the permanent magnet and the flux path which rotates the magnet to an angle of minimum air gap and biases the contacting knife edges of the two vanes to substantially eliminate the motion resulting from the loose fit of the vanes. The flux path is closely coupled to receive a substantial portion of the flux from the permanent magnet and to enable the electric signal applied to the encircling coil to efficiently alter the magnet's flux and resultingly change the point of operation of the magnet on its demagnetization curve.

BRIEF DESCRIPTION OF THE DRAWINGS

These and other features of the invention will be more clearly understood by reference to the following detailed description of a preferred embodiment presented for purposes of illustration, and not by way of limitation, and to the accompanying drawings of which:

FIGS. 1A and 1B are partially pictorial and partially diagrammatic views of a meter according to the invention at different deflection angles;

FIG. 2 is a pictorial and diagrammatic view of the meter of FIGS. 1A and 1B as viewed horizontally;

FIG. 3 is a demagnetization curve for the magnet used with the invention of FIGS. 1A and 1B indicating operating points at different meter deflection angles;

FIG. 4 is a sectional and diagrammatic view of the suspension system for the meter of FIGS. 1A and 1B illustrating its interrelationship with the magnetic circuit;

FIG. 5 and FIG. 6 indicate the component parts of the suspension system indicated in FIG. 4;

FIG. 7 is a close-up view of portions of the suspension system;

FIG. 8 and FIG. 9 are diagrammatic representations of the pivoting action of the suspension system.

DETAILED DESCRIPTION OF A PREFERRED EMBODIMENT

In the conventional D'Arsonval meter an electric coil is pivotally suspended in a magnetic field which may be provided by either a permanent magnet or a second coil responsive to a constant current or the signal being measured. The pivoting coil is excited by the signal to be measured and produces its own magnetic field as a result. The interaction of the two fields produces a torque on the pivoting coil causing it to rotate. An elastic restraint, such as a spiral spring, restrains the rotation of the coil to provide a net deflection representative of the magnitude of the signal measured. Such a system will provide a meter of extraordinary accuracy, but at a substantial cost due to the complexity and sophistication of the motivation, restoring, and suspension elements.

In the alternative moving magnet meter design, a large permanent magnet is rotationally supported with a meter pointer affixed to it. A coil excited by the signal being measured is placed at some distance from the magnet to permit it to rotate and provide a magnetic field cross acting with the magnets field to torque the magnet and swing the pointer across a scale. Restoration and suspension may be provided by conventional designs, or restoration may be achieved by the magnetic force from a second magnet appropriately placed. Meters of this design are typically less costly but possess significant performance defects due to the cost cutting use of simple elements and a lack of functional cooperations between component parts of the meter.

In accordance with the invention pictorially indicated in FIGS. 1A, 1B and 2, however, basic meter functions are more simply provided by the interrelationship of a permanent magnet and a flux path to produce a combination of elements uniquely cooperating toward overall precise meter performance. With specific reference to FIG. 1A, a permanent magnet 12 is secured to a vane 14 to which is attached a pointer 16 for rotation over a scale 18. The vane 14 meshes with a vane 20 to provide an axis of rotation 22 of the vane 14 relative to the vane 20. Vane 20 is attached to a bracket 24 which is secured to the meter housing 26.

The magnet 12 has a tip 23 shaped to direct and concentrate the flux at that point; preferable with a pointed shape slightly rounded for better ballistic characterisitcs. The tip of magnet 12 describes an arc 28 as the vane 14 and magnet 12 rotate with respect to vane 20 through a predetermined angle, for example 100°. An arc of ferromagnetic material 30 is placed slightly eccentric to the axis 22 and has its inner surface 31 spaced just outside the arc 28 to receive the concentrated flux directed from the tip of magnet 12. The distance between arc 28 and inner surface 31 of the ferromagnetic material 30 increases with the angle of rotation of the magnet 12.

Thus, as indicated in FIG. 1B, the gap between the tip of the magnet 12 and ferromagnetic material 30 is larger at an extreme angle of deflection of the magnet 12 than it is for a minimal angle of deflection represented by FIG. 1A.

As can be seen from a horizontal view in FIG. 2, the ferromagnetic material is composed of top and bottom portions 30a and 30b. A ferromagnetic spacer 32 provides a high permeability flux path between the top and bottom portions 30a and 30b at one end. As shown, spacer 32 is located at the end of largest gap or greatest angle of rotation for the magnet 12 but may be at either end or elsewhere. The spacer 32 has a coil 34 wound around it and the coil is excited by the electrical signal being measured, such as from source 36. At the other end, a second spacer 33, of nonmagnetic or magnetic characteristics, holds the portions 30a and 30b spaced. An additional or alternate coil may be wound around portions 30a or 30b for improving sensitivity or achieving other desired characteristics.

Shown in FIG. 2, the magnet 12 has an upper north pole and a lower south pole. Flux between the two poles is induced to travel through the upper portion 30a through the spacer 32 and through the lower portions 30b in a closed loop. By using a high permeability substance for the ferro magnetic material 30a and 30b and spacer 32, a substantial portion of the flux from the magnet 12 can be induced to travel through this flux path.

As is known, the permanent magnet 12, in the presence of a high permeability material will exhibit a force attracting it to that material. In this case, the magnet 12 will be drawn toward portions 30a and 30b. Because the gap between the magnet and material varies with rotation of the magnet 12 the magnet will also experience a torque urging it toward an angle of minimum gap between the ferro magnetic material 30 and the permanent magnet 12. By making the inner surface of the ferro magnetic material arcuate and providing a minimum gap at a point of zero deflection of the pointer 16 on the scale 18, the magnet 12 will stabilize at that point in the absence of any excitation signal applied to the coil 34.

Referring now to FIG. 3, demagnetization curves are illustrated for explaining the unique operation of the meter motivation in the present invention. The demagnetization curves of three typical permanent magnets are presented; curve 40 represents the magnetization curve for a typical alnico magnet, curve 42 for a LODEX (a trademark of the General Electric Company) magnet and curve 44 for a ceramic magnet. Curve 44 with the relatively more linear characteristics represents a more ideal demagnetization curve for use in the present system and will accordingly be the curve used to explain the operation of the meter. A plurality of magnetic load lines 46, 48 and 50 radiate from the zero axis to intercept the demagnetization curve 44 at respective points 52, 54 and 56. Also indicated in FIG. 3, a series of coil flux density drop-off lines 58, 60 and 62 represent operating points for the coil at different current levels and are drawn to intersect the points 52, 54 and 56 respectively.

In operation only a small portion of the demagnetization curve between the points 52 and 56 will be utilized to minimize nonlinearities resulting from the hysteresis curve and to prevent a permanent loss of magnetization in the ceramic magnet. From a point 52 of zero deflection the coil 34 is excited with a predetermined current and there is a corresponding change in the field intensity within the magnet represented by vector 64. The system will balance to maintain itself on the demagnetization curve 44 by cuasing a reduction in the flux density B represented by vector 66 returning the system to a new point 68 on the curve 44 which defines an angle of rotation 70 from zero line 46. The opposite process occurs whenever the current is reduced in the coil 34.

It can be seen that a more linear operation is achieved when the demagnetization curve is itself more linear, though changes in linearity can be programmed into the meter by adjusting the curvature of the ferromagnetic material 30, or positioning of coil 34. In particular, in FIG. 1A it is desirable to flatten the curvature at the point 72 of zero deflection to reduce the tendency of the unexcited meter to oscillate about the zero point. Also, the curvature of the material 30 is slowly reduced from a point of maximum meter deflection to minimum deflection to control meter ballistics and prevent a too rapid return of the meter to zero deflection. A suitable choice of magnetic materials as indicated above will help to minimize the coil bias current necessary to initiate meter motion by locating the load line 46 in FIG. 3 which is a function of magnetic materials and air gaps as close to the verticle axis as possible. This bias current is thus kept a negligible quantity.

A magnet operating on these principles has many advantages. Due to a close coupling between the permanent magnet 12 and flux path 30, the strength and weight of the permanent magnet 12 is kept lower than would be the case with prior art moving magnet meters. Meter wiggle is accordingly eliminated as a significant problem. The lower magnet weight also reduces pivot friction and the resulting meter hysteresis that gives different indications for the same signal. The closer coupling, in addition to providing a higher meter efficiency and greater sensitivity, also reduces the susceptibility of the meter to disturbances from stray fields or magnetic materials from the environment. A further advantage is in a reduction of temperature sensitivity attributable to opposite temperature coefficients for the magnetic properties of magnet 12 and flux path 30 in the case of ceramic and ferromagnetic compositions respectively or other common materials for these elements.

Finally, the unique meter design of the present invention and the novel principles of operation permit sensitive meters of very small size. In prior art moving magnet meters, the meter torque is the mathematical vector product of the coil field and the magnet field. Thus a large coil and magnet will be capable of greater fields and more sensitivity. In the present invention, however, torque is more dependent on geometric ratios and induced flux effects on the demagnetization curve. This permits reducing magnet and meter size without a proportionate reduction in meter sensitivity.

Further details of a preferred suspension system and its advantages when operating with the meter of the invention can be seen with reference to FIG. 4. The ferromagnetic portions 30a and 30b are indicated in section at approximately the point of mid-scale in the meter deflection. The magnet 12 is pictorially indicated positioned at the same point and has cemented thereto the vane 14. The vane 14 is shown more clearly in FIG. 5 as having a central cut-out portion 76 through which the magnet 12 fits and is cemented at its edges to shoulders which contact the peripheral portions of the vane 14 at 78 and 80. Slots 82 and 84 are provided to straddle the vane 20 indicated in FIG. 4 and FIG. 6. The vane 20 also has slots 86 and 88 which straddle the vane 14, in each case the slots 82 and 86 and slots 84 and 88 fitting or meshing together. FIG. 7 indicates more clearly the nature in which the slots fit showing slots 82 and 86 in the vanes 20 and 14 as they are arranged together. Vane 20 may have reduced material in central portion 87 to facilitate bending there for fitting the vanes together with minimum burring of the slot edges. Vanes 14 and 20 are normally fashioned from a thin, nonmagnetic, resilient material such as beryllium-copper.

The width of the slots is sufficient to allow a substantial rotation of one vane with respect to the other, typically 100°. In FIG. 8 one slot, for example slot 86, is indicated in vane 20 straddling the vane 14. As can be seen, in order to allow a ±50° angle of rotation, there must be a substantial gap in the slot 86. In all but extreme positions of rotation the additional width to the gap allows the vanes to wiggle somewhat with respect to each other. It is desirable therefor to cut the edges of the gap at an angle as indicated in FIG. 9 to provide single points of contact or knife edges rather than two points of contact or knife edges for each slot as indicated in FIG. 8. This allows the gap or width of the slot to be reduced slightly. The sharper point of contact also improves the pivoting action and lowers friction. Even with the improved form of FIG. 9, however, there is significant, unwanted, nonrotational motion or "slop" to the knife edge suspension due to the looseness of fit.

The looseness of fit is a function of the difference between the gap 86 distance "g" in FIG. 9 and vane 14 thickness "t." According to the applicable equation $$\cos a/2 = t/g,$$

where $a$ is the total desired rotation angle, the thickness to gap ratio is approximately 0.65 for a 100° total swing. For a typical vane thickness of 10 mils the $g$-$t$ difference ro "slop" is over 5 mils. At the tip of the meter pointer, this looseness could easily translate into a movement of a tenth of an inch or more.

This motion, however, is substantially eliminated in the invention by the attraction of the magnet 12 to the ferromagnetic materials 30a and 30b. This attraction results in a preload or bias on the slotted portions of the vanes forcing the vane 14 against the outer edge of the slots in the vane 20. While the force which produces this preload is reduced when the coil 44 is excited and during the time that the magnet is rotating to a new stable point, it is sufficient to provide significant bias. This force bias also simplifies the meter balancing requirements to the point where only a rough balance need be done.

Optionally, an additional piece of ferromagnetic material 90 may be added between the portions 30a and 30b and outside of the magnetic circuit between the poles of the magnet 12 through portions 30a and 30b and spacer 32. The gap from material 90 to magnet 12 may remain constant. It is shown in FIG. 4.

Having described above a preferred embodiment of the invention, it will occur to those skilled in the art that substantial adaptations, modifications and alterations can be made without departing from the spirit of the invention. The vanes 14 and 20, while preferably of low permeability, nonmagnetic metal may be otherwise structured. A more conventional suspension system may also be employed. Also linear or other motion in addition to rotation between teh magnet and the flux path may be employed. Linear motion can be achieved using a rolling or sliding guide to relatively support the magnet and flux path. It is accordingly intended to limit the scope of the invention only as indicated in the following claims.

What is claimed is:

1. A permanent magnet meter operating in response to an electrical signal and comprising:
 a magnet;
 means responsive to said electrical signal for inducing a magnetic flux representative of said electrical signal;
 means for positioning said flux inducing means and operative to direct flux in opposite directions between said magnet and said flux inducing means in a close coupling arrangement and to produce an alteration in the flux from said magnet in accordance with the demagnetization curve thereof in response to flux induced by said electrical signal; and
 means for supporting said magnet to allow relative motion between said magnet and said directing means;
 said positioning means being adapted to provide a stable position for said magnet relative to said inducing means with said stable position being a function of the flux induced by said electrical signal.

2. A meter responsive to electrical signals to provide an indication of the magnitude thereof comprising:
 a flux source;
 a flux path for a substantial portion of the flux of said flux source;
 means for supporting said flux path and said flux source to provide relative motion therebetween;
 said flux path being adapted to vary its reluctance to the flux from said source with relative position of said source so as to provide a restoring force urging said source to a stable position relative to said flux path as a result of the magnetic attraction between said source and said flux path;
 means for impressing a flux in said flux path in response to said electrical signal to oppose the flux of said flux source whereby the stable position of said flux source with respect to said flux path is caused to vary, producing a motion of said source with respect to said flux path to a new stable position.

3. A permanent magnet meter operative to indicate the magnitude of an electrical signal and comprising:
 a permanent magnet;
 a flux path operative to accept a portion of the flux induced by said magnet at one pole and to return said flux to said magnet at another pole;
 means for mounting said permanent magnet with its pole faces toward said flux path to allow motion of said magnet relative to said flux path;
 the relative mounting of said flux path providing a gap between said flux path and the pole faces of said magnet which varies with relative position of said permanent magnet; and
 means for applying a variable flux to said flux path with a polarity which opposes the flux of said permanent magnet, and operative to generate said variable flux to represent said electrical signal;
 said variable flux being operative to cause relative motion of said magnet thereby to provide an indication of said electrical signal.

4. A permanent magnet meter responsive to electrical signals to provide an indication of the magnitude thereof comprising:
 a permanent magnet;
 a flux path for a portion of the flux of said permanent magnet;
 means for supporting said flux path and said permanent magnet to provide rotation therebetween;
 said flux path being adapted to vary its reluctance to said permanent magnet flux with rotation thereof so as to provide a restoring torque to a stable angle of rotation resulting from the magnetic attraction between said magnet and said flux path;
 means for impressing a flux in said flux path in response to said electrical signal in a direction to oppose flux in said permanent magnet whereby the stable angle of said permanent magnet with respect to said flux path is caused to vary, producing a rotation of said magnet with respect to said flux path.

5. The permanent magnet meter of claim 4 wherein:
 said means for supporting said permanent magnet includes a plurality of thin vanes which are adapted to mesh with each other in a loose fit to allow rotation of said plurality of vanes with respect to each other; and
 said permanent magnet is affixed to one of said vanes whereby motion permitted by the looseness of fit of said plurality of vanes is reduced by the attraction force of said permanent magnet to said flux path.

6. The permanent magnet meter of claim 4 wherein said permanent magnet is a ceramic magnet.

7. The permanent magnet meter of claim 4 wherein said permanent magnet is shaped to concentrate and direct its flux toward said flux path.

8. A permanent magnet meter operative to provide an indication of the magnitude of an electrical signal and comprising:
 a permanent magnet;
 a flux path for at least a portion of the flux from said permanent magnet;
 means for pivotally mounting said magnet with respect to said flux path and including two or more slotted vanes having their slots fit together to permit said vanes to rotate with respect to each other throughout a predetermined angle;
 said permanent magnet being secured to at least one of said vanes in an orientation to provide magnetic attraction between said permanent magnet and said flux path and to urge a rotation between said magnet and said flux path to a stable angle, the fitted slots of said plurality of vanes being thus urged against each other by the attraction of said permanent magnet to said flux path whereby the motion produced by the looseness of fit between said plurality of vanes required to permit rotation thereof is reduced; and means for applying a flux to said flux path in a polarity substantially to oppose the flux of said permanent magnet, said applied flux being representative of said electrical signal and operative to vary the stable angle of rotation of said magnet with respect to said flux path.

9. The permanent magnet meter of claim 8 wherein one or more of said vanes is shaped to permit ease in fitting together the slots of said vanes without substantial burring of the edges of said slots.

10. A permanent magnet meter operative to indicate the magnitude of an electrical signal and comprising:

a permanent magnet;

means for supporting said permanent magnet to allow rotation thereof about an axis;

a flux path operative to accept a portion of the flux from said magnet at one pole and to return said flux to said magnet at another pole;

said flux path arcing about the axis of rotation of said permanent magnet with a gap between the inner surfaces of said flux path and the outer surface of said magnet;

said flux path being oriented to provide a variation in said gap with rotation of said permanent magnet; and means for applying a flux to said flux path with a polarity to oppose the flux of said permanent magnet, said applied flux being representative of said electrical signal and effective to cause rotation of said magnet to maintain said magnet on its demagnetization curve.

11. The permanent magnet meter of claim 10 wherein:

said means for supporting said permanent magnet includes a plurality of thin vanes which are adapted to mesh with each other in a loose fit to allow rotation of said plurality of vanes with respect to each other; and said permanent magnet is affixed to one of said vanes whereby motion permitted by the looseness of fit of said plurality of vanes is reduced by the attraction force of said permanent magnet to said flux path.

12. The permanent magnet meter of claim 10 wherein said permanent magnet is a ceramic magnet.

13. The permanent magnet meter of claim 10 wherein said permanent magnet is shaped to concentrate and direct its flux toward said flux path.

14. The permanent magnet meter of claim 10 further including a second flux path providing a gap with said magnet, said second flux path being substantially outside the flux circuit of the first mentioned flux path.

15. A meter operative to provide an indication of the magnitude of an electrical signal and comprising:

means for providing a magnetic flux;

means for rotationally supporting said magnetic flux providing means to allow rotation of said magnetic flux providing means about an axis;

a flux path positioned to accept at least a portion of the flux from said magnetic flux providing means and to provide a variation in the reluctance of said flux path with rotation of said flux providing means so as to provide a restoring torque and a stable angle of rotation between said magnetic flux providing means and said flux path;

means operative in response to said electrical signal to apply flux representative of said signal through said flux path to oppose the flux of said flux producing means thereby to produce a variation in torque between said flux producing means and said flux path as a result of flux from said flux providing means and said flux applying means whereby an angle of zero torque between said flux providing means and said flux path varies with said electrical signal.

16. The permanent magnet meter of claim 8 wherein said permanent magnet has a relatively linear demagnetization curve.

17. The permanent magnet meter of claim 8 wherein:

said flux path includes first and second arcuate magnetic elements having first and second concave surfaces respectively; and means for securing said first and second elements to each other in parallel spaced relationship and for providing a high permeability flux path therebetween; and said permanent magnet includes a tip arranged with respect to said pivotally mounting means whereby said tip describes an arcuate path upon rotation of said magnet;

said first and second elements being disposed with their concave surfaces facing said tip of said permanent magnet and spaced from said arcuate path by a gap which continuously increases from a minimum gap.

18. The permanent magnet meter of claim 17 wherein said tip portion of said permanent magnet is generally rounded.

19. The permanent magnet meter of claim 17 wherein said first and second concave surfaces of said first and second arcuate magnetic elements are slightly flattened at said point of minimum gap.

20. An electrical meter operative to provide an indication of the magnitude of an electrical signal and comprising:

a magnet having a tip portion;

means for pivotally mounting said magnet to allow rotation thereof through a predetermined angle;

the tip portion of said magnet defining a circular arc as said magnet rotates;

first and second arcuate magnetic elements having respective first and second concave surfaces;

means for securing said first and second elements together and providing a high permeability flux path therebetween;

means for mounting the secured first and second arcuate elements relative to the pivotal axis of said magnet with said first and second concave surfaces facing said magnet with a spacing between said circular arc and said concave surfaces which continuously increases from a point of minimum gap; and means for inducing a magnetic flux in said first and second elements in response to said electrical signal in a direction to oppose the flux of said magnet.

21. The electrical meter of claim 20 wherein said flux inducing means includes a coil enclosing said means for securing said first and second arcuate elements.

22. The electrical meter of claim 20 wherein said magnet has first and second magnetic poles respectively facing the first and second concave surfaces of said first and second elements wehreby magnet flux between said poles is directed through said first and second elements and said high permeability securing means.

23. The electrical meter of claim 20 and further including a pointer supported to rotate with said magnet and provide an indication of the angle of rotation of said magnet in response to flux induced by said electrical signal.

24. A magnet meter for indicating the magnitude of a signal comprising:
a first flux source;
a second flux source having a flux responsive in magnitude to said signal;
a magentic circuit for the fluxes of said first and second flux sources;
means for supporting said first flux source for relative motion with respect to said magnetic circuit;
said magnetic circuit including:
means for applying the flux from said second flux source to said first flux source in opposition to the flux of said first flux source throughout a range of positions of said first flux source with respect to said magnetic circuit;
means responsive to the position of said first flux source for producing correspondingly different values of reluctance in said magnetic circuit to the fluxes from said first and second flux sources whereby said first flux source has a stable position in said range of positions representative of the magnitude of said signal, said stable position representing a position of minimum reluctance.

25. A meter responsive to electrical signals to provide an indication of the magnitude thereof comprising:
a flux source;
a flux path for a substantial portion of the flux of said flux source and including an arctuate magnetic arm positioned to accept flux from said flux source;
means for supporting said flux path and said flux source to provide relative motion therebetween;
said flux path being adapted to vary its reluctance to the flux from said source with relative position of said source so as to provide a restoring force urging said source to a stable position relative to said flux path as a result of the magnetic attraction between said source and said flux path;
means for impressing a flux in said magnetic arm in response to said electrical signal whereby the stable position of said flux source with respect to said flux path is caused to vary over a range producing a motion of said source with respect to said flux path to a new stable position within said range;
said flux impressing means including means for providing said flux in said arctuate magnetic arm below saturation for said arm over said range in its response to the impressed flux from said electrical signal.

* * * * *